Patented July 29, 1930

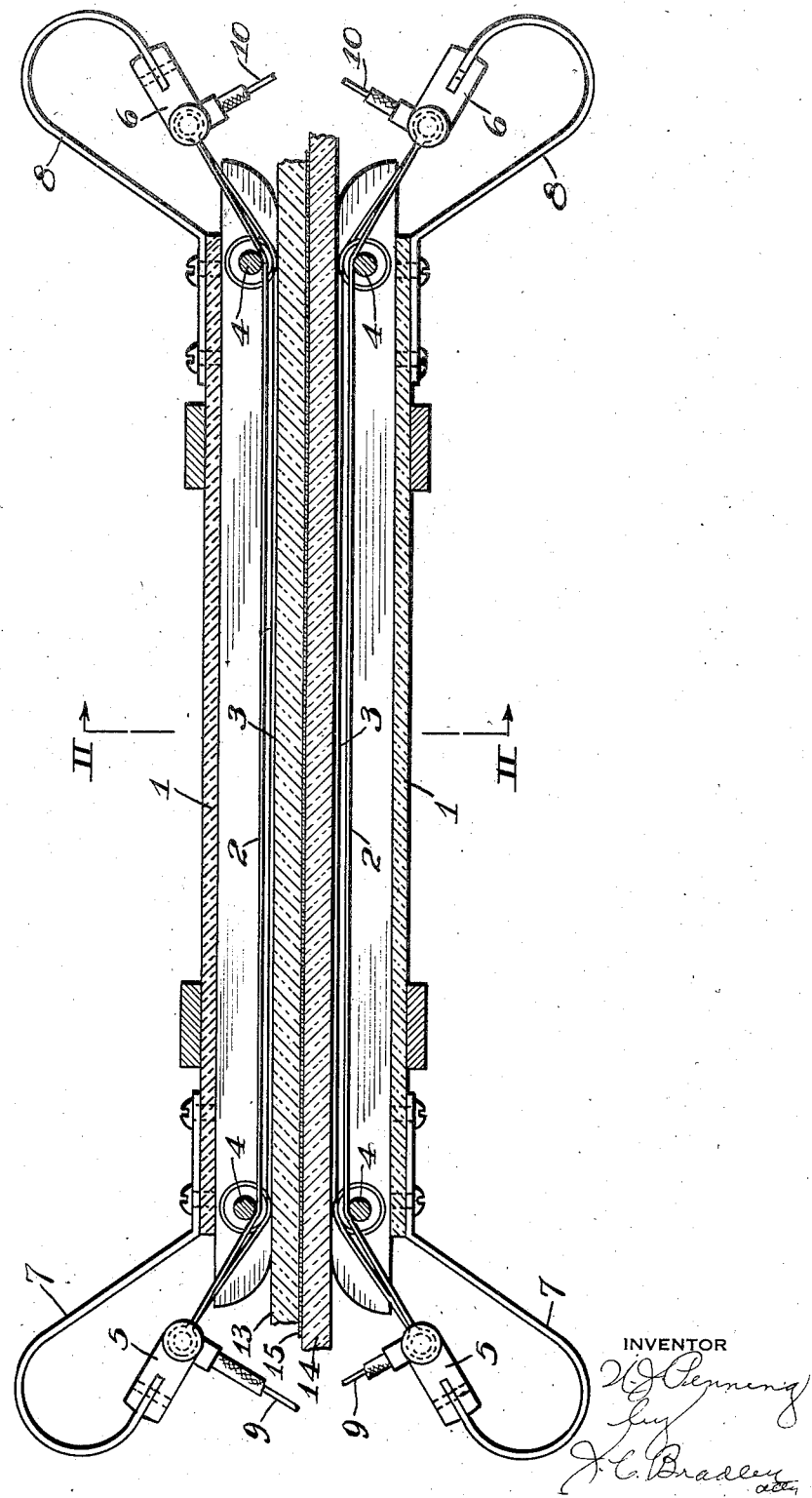

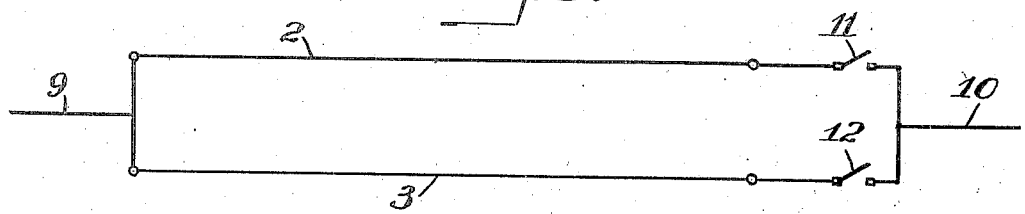
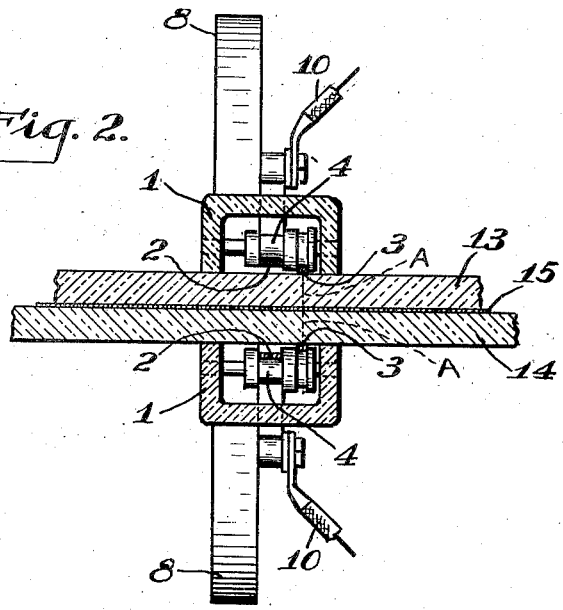
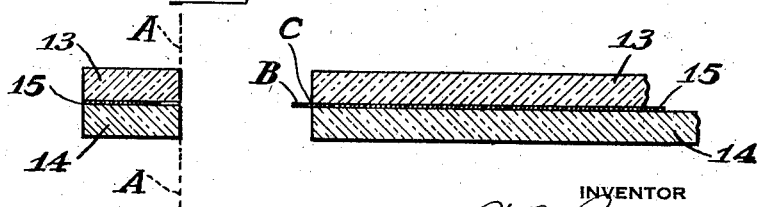

1,771,510

UNITED STATES PATENT OFFICE

NICHOLAS J. PENNING, OF PITTSBURGH, PENNSYLVANIA, ASSIGNOR TO DUPLATE CORPORATION, A CORPORATION OF DELAWARE

APPARATUS FOR SEVERING COMPOSITE GLASS

Application filed December 13, 1928. Serial No. 325,689.

This invention relates to apparatus for severing composite glass sheets by the application of heat preferably by the use of heat generated by the passage of electric current through resistance elements. The heat as thus applied serves to crack the two glass sheets and to soften the interposed pyroxylin plastic, so that it may be readily separated by tearing. The invention has for its objects the provision of an apparatus and process which may be applied to sever the glass so that all defects incident to the operation lie on one side of the line of cut, in the strip of waste glass, which is cut off. This is accomplished by heating the plate along a line parallel to the proposed line of cut, but to one side thereof, so that when the two sheets of glass are cracked, and force is applied to tear the plastic sheet, such tearing will occur along the line of heating which lies to one side of the line of cracking of the glass and any stretching and thinning of the plastic, incident to the tearing, will thus lie in the waste strip. The heat is preferably applied by means of two sets of electrically heated ribbons, one set of which applies heat for a considerable period to heat the plate to one side of the line of cut, so as to soften the plastic, while the other set applies heat only momentarily along the proposed line of cut to give the temperature necessary for cracking the glass sheets. One form of apparatus for carrying out the process is shown in the accompanying drawings, wherein:

Figure 1 is a longitudinal section through the apparatus in position of use. Fig. 2 is a transverse section on the line II—II of Fig. 1. Fig. 3 is a wiring diagram. And Fig. 4 is an enlarged section through the sheet showing how the separation takes place.

As indicated in Figs. 1 and 2, two heating devices are preferably employed, one on top of the sheet to be cut, and one below, but it will be understood that the process may be carried out with only one device, although not so rapidly. The two devices are duplicates, and each comprise a channel bar 1 of insulating material carrying a pair of resistance wires or ribbons 2 and 3 extending over the rollers 4, 4 of insulating material and secured to pairs of terminal blocks 5 and 6 carried by springs 7 and 8 for keeping the wires under tension. Current is supplied through the leads 9 and 10, the wires 2 and 3 being insulated from each other, so that current may be supplied independently through each wire for different intervals of time, as later explained, this being controlled by the use of switches 11 and 12, as indicated diagrammatically in Fig. 3.

In order to make a cut along the lines A, A, the devices are applied, as indicated in Fig. 2, the plate to be cut being made up of the usual glass sheets 13 and 14 cemented to the sheet of pyroxylin plastic 15, such as celluloid. The switches 11 are first closed so that current passes through the wires 2, and this is continued until the plastic lying between the channels 1, 1 is softened, so that it may be readily stretched and pulled apart or torn after the glass sheets 13 and 14 are cracked. The switches 12 are now closed, so that current passes through the wires 3 which contact with the glass so that they heat it very rapidly. This flow is required only for a second or two, when the channels are removed and a wetted tool is touched to the lines just heated by the wires 3. The glass sheets 13 and 14 immediately crack along the lines A, A, and as soon as this occurs, the operator grasps the two parts of the plate, and pulls them apart, as indicated in Fig. 4. This can be done, because the plastic has been sufficiently softened from the action of the wires 2. Furthermore, this separation of the plastic occurs along a line to the left of the lines A, A, since the softening of the plastic is for the most part on such side, and adjacent the wire 2. In practice, the separation occurs as indicated in Fig. 4, the tongue B of plastic being pulled out from between the glass sheets. This tongue is subsequently removed with a knife.

The method of separation, as just described, involving the softening of the plastic to one side of the proposed lines of cut A, A, and the stretching and tearing of the plastic on such side involves an important advantage in that the plastic at C is not stretched or thinned, so that the joinder between the plastic and the glass sheets at this point is not impaired. Where such joint is impaired to the slightest extent or the slightest separation occurs, the product may be ruined, as a separation or "let go" after once starting, keeps progressing inward until the appearance of the sheet is spoiled and replacement is required. The procedure described avoids this difficulty, as all the defects incident to the separation lie in the sheet of waste glass to the left of the lines A, A. If a sheet is to be separated through its center so that both edges must be perfect, the sheet is cut as above described, and then the process is applied to cut off the defective edge to the width of about one inch. The process does not necessarily require that the cracking along the lines A, A, should be accomplished by means of the heated wires 3, 3, although this is the preferred procedure. If desired, such cracking may be accomplished by the use of a diamond or a scoring wheel. Other means, aside from the wires 2, 2, might also be used to heat the plate to the left of the lines of cut A, A and soften the plastic, although the resistance wires are preferred for accomplishing this function.

What I claim is:

1. Apparatus for severing a composite glass plate by electricity, a supporting bar having a channel in one side, and a pair of resistance conductors mounted in said channel extending longitudinally thereof in parallel, one of said conductors being located along the side of the channel and the other one being spaced inward from the first conductor.

2. Apparatus for severing a composite glass plate by electricity, a supporting bar having a channel in one side, and a pair of resistance conductors mounted in said channel extending longitudinally thereof in parallel, one of said conductors lying in the channel to the rear of the plane of the front edges of the channel, so that such conductor is spaced away from the surface of the sheet to be severed, while the other conductor is located at the plane of said edges so that it contacts with said surface.

In testimony whereof, I have hereunto subscribed my name this 11th day of December 1928.

N. J. PENNING.